Nov. 9, 1937.  J. S. KNIGHT  2,098,250
DEVICE FOR HANDLING FROZEN MATERIAL
Filed Feb. 6, 1933  3 Sheets—Sheet 1
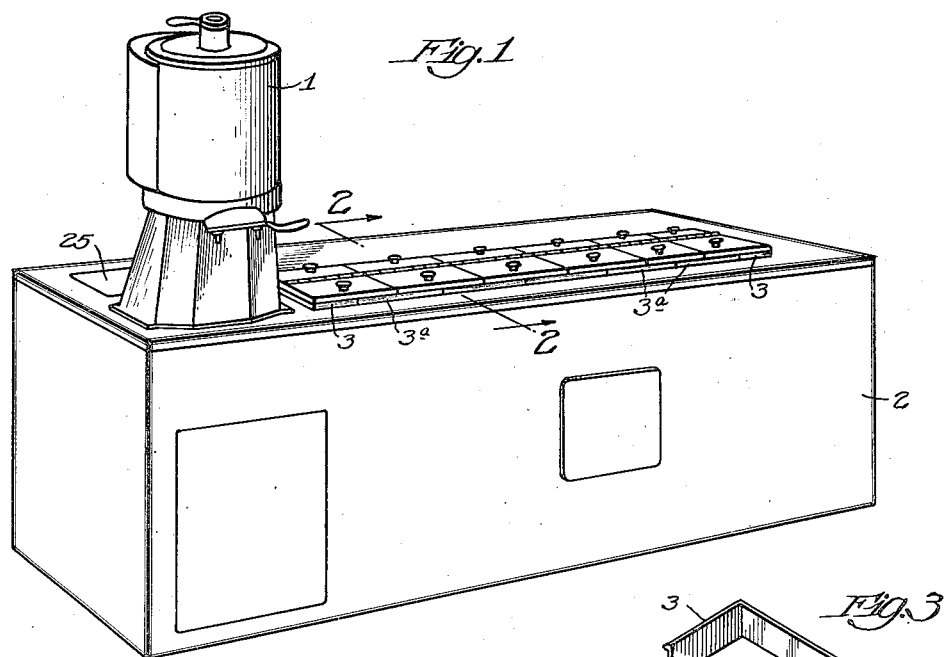
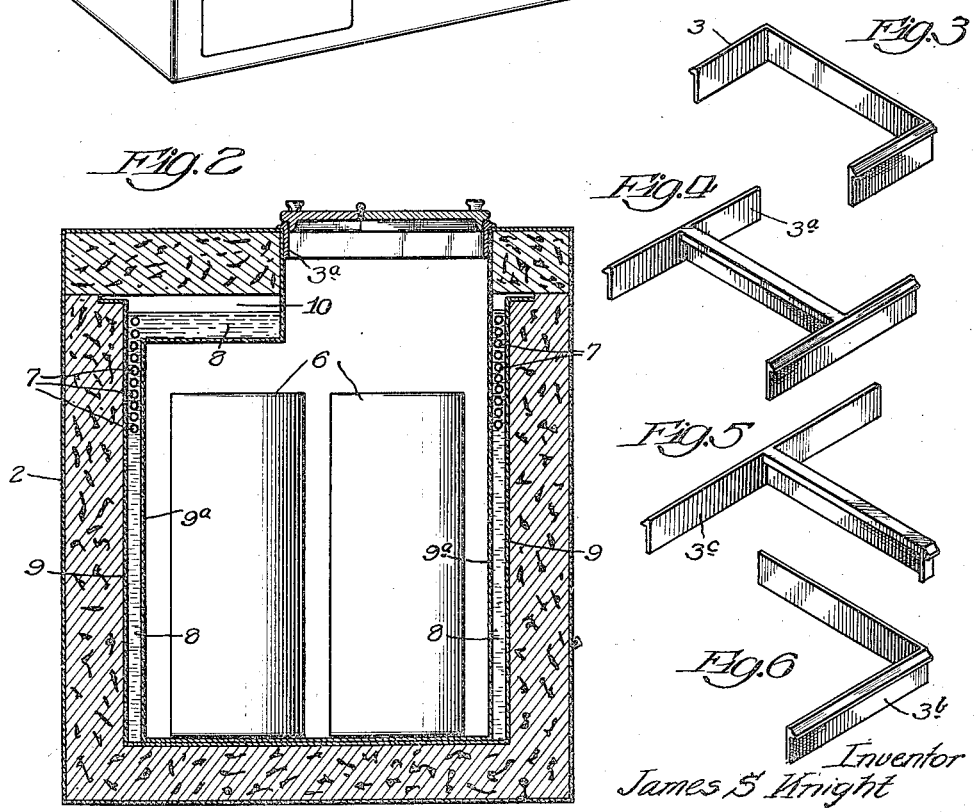
Inventor
James S. Knight
By Parker Carter
Attys

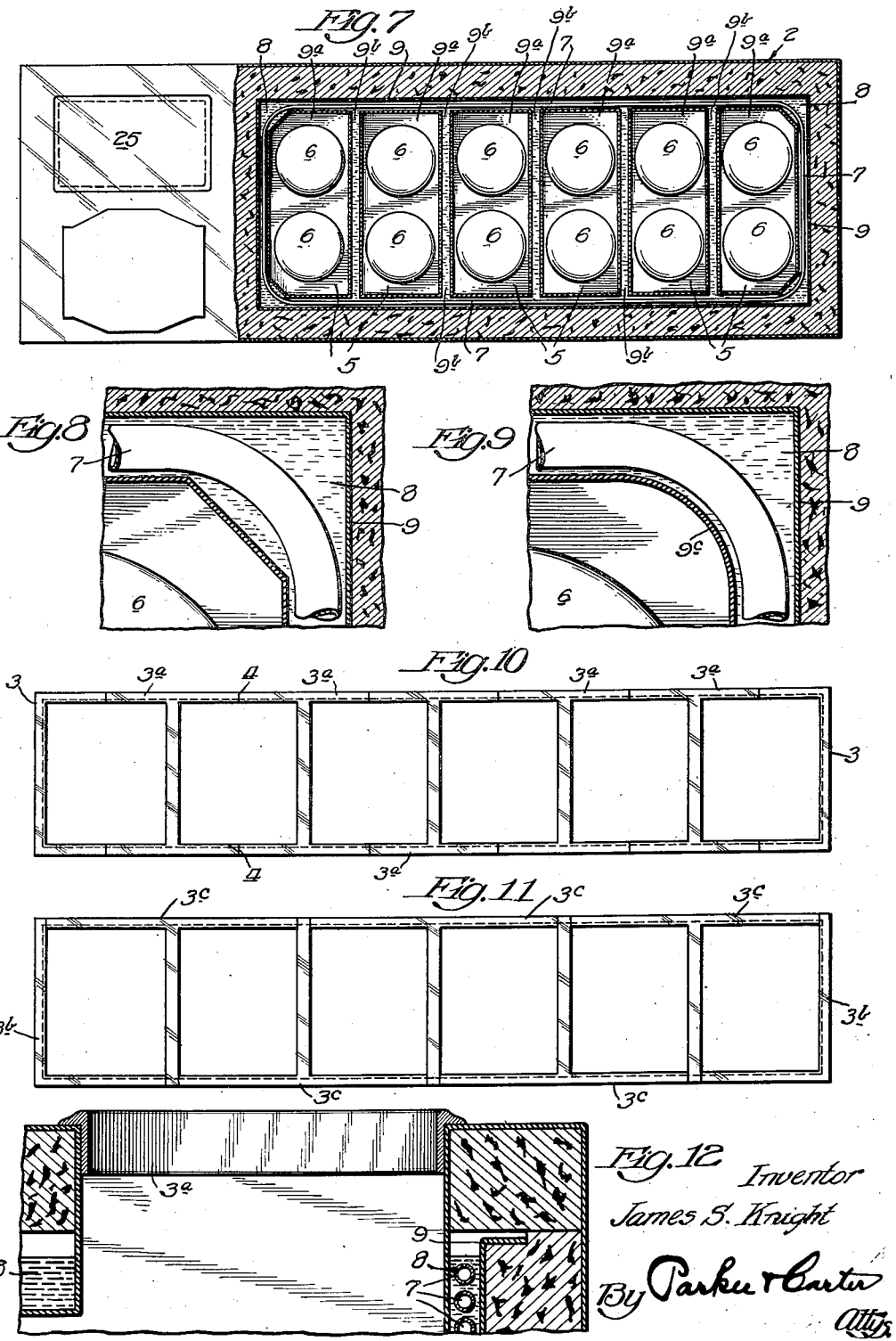

Nov. 9, 1937.  J. S. KNIGHT  2,098,250
DEVICE FOR HANDLING FROZEN MATERIAL
Filed Feb. 6, 1933  3 Sheets-Sheet 3
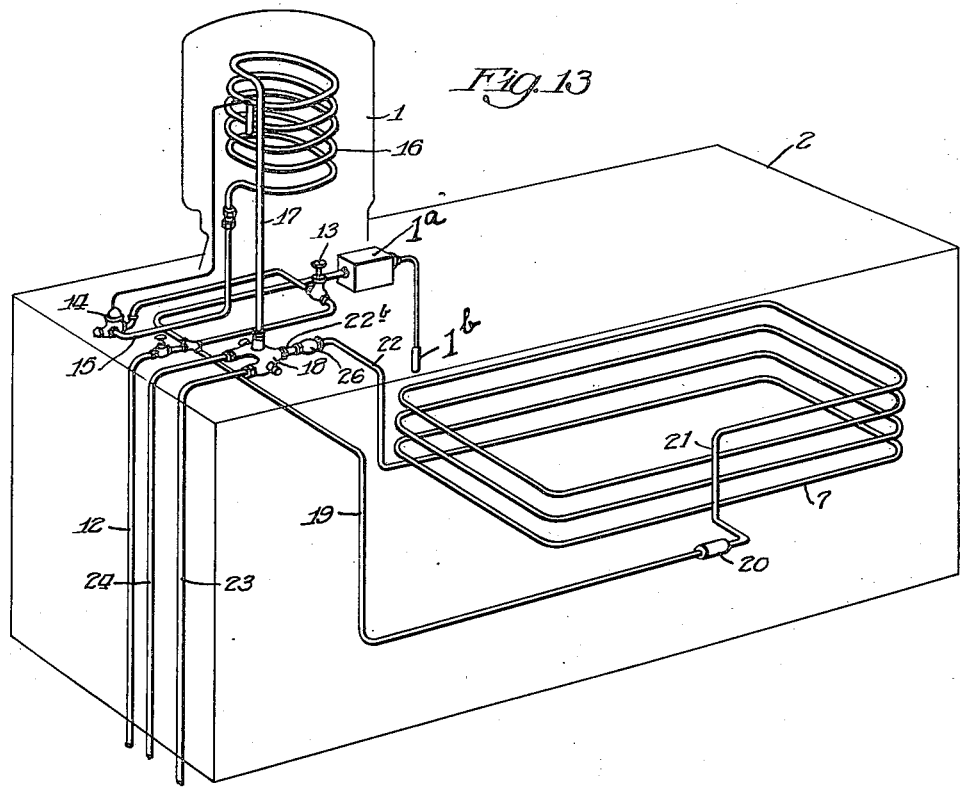
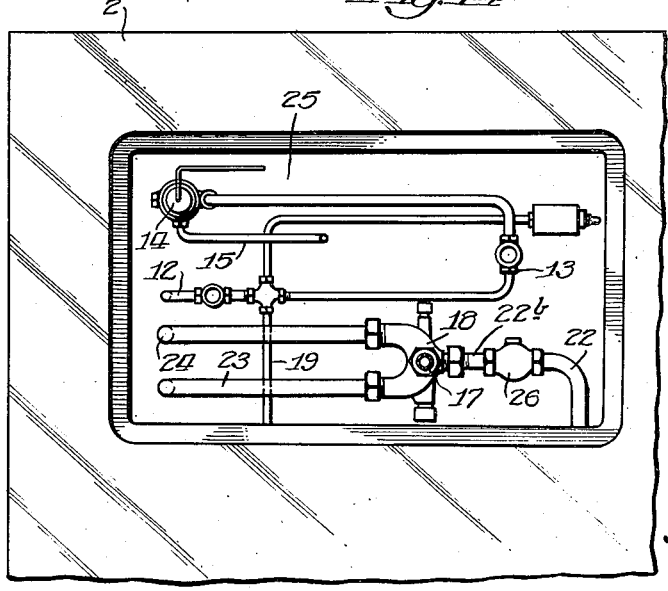
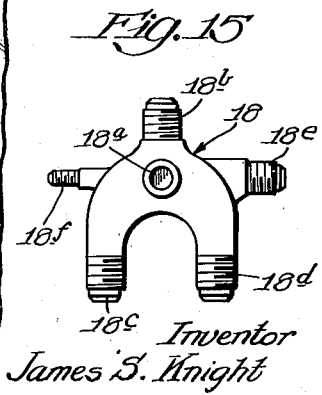
Inventor
James S. Knight
By Parker + Carter
Attys.

Patented Nov. 9, 1937

2,098,250

UNITED STATES PATENT OFFICE 2,098,250

DEVICE FOR HANDLING FROZEN MATERIAL

James S. Knight, Chicago, Ill.

Application February 6, 1933, Serial No. 655,384

8 Claims. (Cl. 62—114)

This invention relates to devices for handling frozen material, such as ice cream, and has for its object to provide a new and improved device of this description. The invention has as a further object to provide a hardening cabinet for containing the ice cream and maintaining it in a hardened condition. The invention has as a further object to provide a combined ice cream freezer and hardening cabinet forming a single unit. The invention has as a further object to provide a device for handling frozen material having a frame at the top having a series of openings, the frame being made in molded sections, the two end sections being similar to each other and the intermediate sections being similar to each other, so that all the sections may be made with two molds. The invention has as a further object to provide a hardening cabinet with end containers made rounded, or with the corners cut off, so as to require only a minimum length in the surrounding refrigerating coil. The invention has as a further object to provide a device for handling frozen material with a refrigerating coil and connections arranged in an efficient manner. The invention has other objects which are more particularly pointed out in the accompanying description.

Referring now to the drawings, Fig. 1 is a view of one form of device embodying the invention;

Fig. 2 is an enlarged sectional view taken on line 2—2 of Fig. 1;

Fig. 3 is a view showing one form of the end section of the top frame of the hardening cabinet illustrated in Fig. 10;

Fig. 4 is a view showing one of the intermediate sections for the frame for the hardening cabinet shown in Fig. 10;

Fig. 5 is a view showing one of the intermediate sections of the frame of the hardening cabinet shown in Fig. 11;

Fig. 6 is a view showing one of the end sections of the frame of the hardening cabinet shown in Fig. 11;

Fig. 7 is a plan view of the device with the top of the hardening cabinet removed showing the parts in section;

Fig. 8 is an enlarged view showing the form of corner of the end receptacle in the hardening cabinet;

Fig. 9 is a view similar to Fig. 8 showing a modified form of corner;

Fig. 10 is a plan view showing the frame at the top of the hardening cabinet;

Fig. 11 is a view similar to Fig. 10 showing a modified construction;

Fig. 12 is an enlarged view with parts showing the construction of the top of Fig. 2;

Fig. 13 is a perspective view showing the refrigerant coils more or less diagrammatically;

Fig. 14 is an enlarged view showing the door at the top of the device by which access to the valves and other parts is secured;

Fig. 15 is a view of the fitting used in connecting up the different pipes.

Like numerals refer to like parts throughout the several figures.

Referring now to the drawings, Fig. 1 is a view showing one form of the invention. In this construction there is an ice cream freezer 1 which may be of any suitable construction and in which the material is frozen. This freezer is mounted upon a hardening cabinet 2. The hardening cabinet may be made of any suitable material and is preferably made with a frame for the covers, consisting of sections 3 and 3a, Figs. 3, 4, and 10, which are connected together at 4 near the middle of each compartment 5 into which the hardening cabinet is divided. This frame, when so connected, forms substantially one piece and eliminates crevices. This frame is preferably made of molded material, such as bakelite, and it will be seen that by means of this construction only two molds are required, one mold forming the end sections 3, which in this case are U-shaped, and the other mold forming the intermediate sections 3a, which are T-shaped.

In Fig. 11 I have shown a modified construction. In this construction the end sections 3b are L-shaped, and the intermediate sections 3c are T-shaped, but in this case the bottom of the T is omitted, Figs. 5 and 6. It will also be seen that in this construction only two molds are required, one for the end sections and one for the intermediate sections.

The hardening cabinet is properly insulated and receives the containers 6 containing the material to be maintained in a hardened condition. These containers are surrounded by a cooling apparatus which, as herein shown, consists of a coil 7 immersed in a liquid 8, such as brine, contained in an outer shell 9. This hardening cabinet is preferably arranged with a series of receptacles 9a located in the receptacle or outer shell 9. These receptacles 9a are separated by spaces 9b. The coil 7 passes around all of these receptacles, as indicated, and the liquid 8 fills the space 9b between the receptacles 9a, and also the space between the receptacles and the outer shell 9. The corners of the end receptacles 9a are rounded or cut off so that a minimum length of refrigerating coil is required. In Fig. 7 I have shown these corners cut off. The corners of the outside shell 9 are not cut off, but are square corners, as shown. The coil 7 at the ends is bent in a curve, as shown in Fig. 8.

In Fig. 9 I have shown a modified construction where the corners of the end receptacles, instead of being cut off, are rounded as shown at 9c, Fig. 9. The hardening cabinet is arranged with a section or portion 10, containing brine or any other suitable refrigerant, which projects partway over the top of the space into which the containers 6 are received. This arrangement, whereby there is a layer of the refrigerant over a portion of the top of the space for the containers, greatly reduces the time for hardening the material in the containers and greatly increases the efficiency of the device.

In Fig. 13 I have illustrated the pipe arrangement, the pipe 12 coming from the compressor and containing the refrigerant. This pipe 12 runs to the shut off valve 13, and thence to the expansion valve 14, which may be a thermostatic expansion valve of the usual type. The refrigerant then passes through the pipe 15 to the coil 16 of the freezer 1, and then from the coil 16, by the pipe 17, to the fitting 18. A pipe 19 connects with the pipe 12 and leads to the expansion valve 20, and a pipe 21 leads from said expansion valve to the coil 7. A pipe 22 connects the coil 7 with a check valve 26, and a pipe 22b connects this check valve with the fitting 18. A hand valve may be substituted for the check valve 26, if desired. When the freezer is in operation, this check valve prevents the refrigerant, after going through the freezer coil, from entering the coil 7, as would be the case if there was no check valve or closed valve at this point. The pipes 23 and 24 connect the fitting 18 with the compressor, being the suction line or return pipes to the compressor. The check valve limits the operation of the compressor to the freezer when the freezer is operating, as the check valve closes automatically so that the compressor is connected only with the freezer. When the operation of the freezer ceases, then the check valve opens to permit the coil leading to the compressor to be connected to the coil 7. When the freezer is in operation, therefore, it has a one-hundred percent connection with the compressor, there being no connection to the coil 7. There is also connected in the system a thermostatic control 1a with high pressure cut out and which is provided with a thermostatic control bulb 1b located in the cabinet.

It will be noted that the fitting 18 has a top face, a bottom face and two end faces, and is provided with a series of connecting members to which pipes may be connected, said connecting members, as shown in the illustration in Fig. 13, projecting from three of said faces. As illustrated in Fig. 15, there are six of these connecting members, 18a, 18b, 18c, 18d, 18e, and 18f, thus permitting the one fitting to be used for a large number of connections. In any situation where all the connecting members are not used, closures are placed upon the ones not in use.

The preferred form of hardening cabinet, which is illustrated in Fig. 2, has a part of the cabinet which extends over the top of a portion of the space for the containers containing the material, and which is in fact a part of the cabinet 2 and which is provided with heat insulating material. Beneath this portion 2a is the cooling device 10, this section or portion 10 extending over the top of a portion of the space for the containers. A heat insulating cover is provided for the cabinet and is arranged in sections so that the sections can be opened separately.

Great difficulty has occurred in keeping the upper part of the material in the cans in the hardening cabinet from being soft. In order to cure this defect, the coil for the refrigerant is so arranged that the refrigerant enters the top coil of the pipe and passes downwardly as it passes around the device. This insures the material at the top of the cans remaining hard. There is a door or opening section 25 arranged so that easy access may be secured to the various valves and connections associated with the pipes used in the device. This door is located directly behind the freezer 1, as shown in Fig. 1.

I claim:

1. A device for handling frozen material comprising a hardening cabinet provided with a space for the containers containing the material, a cooling device extending around said space, a portion of such cooling device projecting over a part of the top of said space and an insulating piece forming the closure for the top of the portion of the cooling device projecting over the top of said space.

2. A device for handling frozen material comprising a hardening cabinet having a space for containers containing said material, a cooling device for said hardening cabinet, said cooling device extending partway over the top of the space into which said containers are received and an insulating piece forming the closure for the top of the portion of the cooling device projecting over the top of said space.

3. A device for handling frozen material, comprising a hardening cabinet having a space for the containers containing the material, said cabinet having a part of insulating material which extends over the top of a portion of said space, said insulating material acting as the closure therefor, there being beneath said part a cooling device which extends over a portion of said space.

4. A device for handling frozen material, comprising a hardening cabinet with an elongated opening leading to the storage chamber, a frame member at the top thereof, said frame member being of non-metallic material and constituting a facing for said opening, said frame having a series of openings therein, the frame being made in moulded sections, the two end sections being similar to each other and the intermediate sections being similar, whereby all of the sections may be made with two moulds.

5. A device for handling frozen material comprising a freezer, a cabinet associated therewith, pipes through which the refrigerant is passed associated with said freezer and said cabinet, said pipes supplied from the same source of supply, valves and thermostats controlling said pipes and located in said cabinet, and a door at the top of the cabinet directly behind the freezer and in proximity to said valves and thermostatic devices so that easy access is secured thereto.

6. A device for handling frozen material comprising a hardening cabinet, with a cooling device having end sections of heat conducting material, said end sections having the corners rounded, and coils extending around said cooling device, each coil extending entirely around the interior of the entire cooling device outside of the cooling area, and having rounded corners extending around and in proximity to the corners of the cooling device.

7. A device for handling frozen material comprising a hardening cabinet provided with an elongated opening leading to the storage chamber, a frame member at the top thereof, said frame member constituting a facing for said opening, said frame having a series of openings therein, the frame being made in sections, the sections being connected together to form the complete frame.

8. A device for handling ice cream comprising a hardening cabinet having a space for the container containing the ice cream, a coil extending entirely around said cabinet for the refrigerant and located at the outer boundary of the space for the container and in a substantial vertical plane, said coil being immersed in a refrigerating liquid, the coil extending successively from the top to the bottom of the container, the refrigerant for the coil entering the coil at the top and acting upon the refrigerating liquid where the refrigerating liquid is the warmest and the refrigerant in the coil at its maximum efficiency, such refrigerant passing around the coil continuously downward to its discharge point from the lower section of the coil, whereby the upper portion of the ice cream in the container is kept hard and the ice cream in the container is kept in proper hardened condition throughout the container.

JAMES S. KNIGHT.